June 5, 1934.      C. G. GARTON      1,961,823
ELECTRIC MEASURING SYSTEM
Filed Nov. 30, 1931
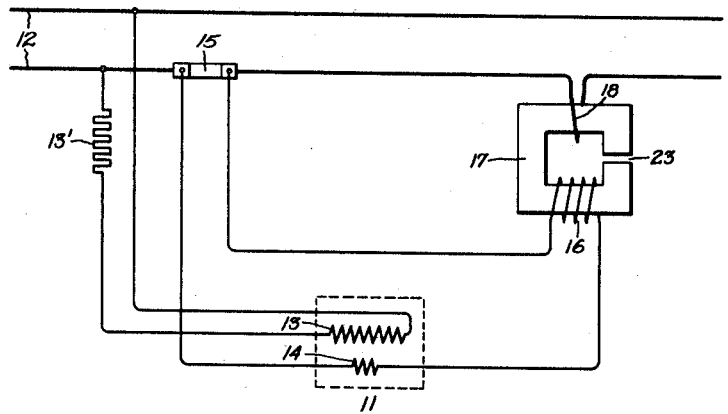
Inventor:
Charles G. Garton,
by Charles E. Tullar
His Attorney.

Patented June 5, 1934

1,961,823

UNITED STATES PATENT OFFICE 1,961,823

ELECTRIC MEASURING SYSTEM

Charles G. Garton, Rugby, England, assignor to General Electric Company, a corporation of New York Application November 30, 1931, Serial No. 577,870
In Great Britain February 19, 1931

9 Claims. (Cl. 171—34)

My invention relates to electric measuring instruments and more particularly to arrangements of instruments for measuring currents in circuits carrying both direct and alternating current components simultaneously. The invention has for its object extending the range of measuring instruments beyond that possible for the direct series connection.

In connection with the measurement of power in mercury arc rectifier circuits, for example, it becomes necessary to connect the current coil of the wattmeter in a circuit carrying both direct current and alternating current components simultaneously. Where the total magnitude of the current is such that the wattmeter can be conveniently connected in series, this presents no difficulty, but where the current is larger, say of the magnitude of 500 amps. or more, it becomes difficult to construct a wattmeter for direct series connection. In circuits carrying alternating current only, this difficulty is readily overcome by the use of current transformers, but these cannot be used where a direct current component is present.

A well-known alternative is to connect the wattmeter across a low resistance carrying the main current thus shunting a small known fraction of the current into the wattmeter coil. A difficulty arises in this connection that, in order to obtain the same shunting ratio for the direct and alternating current components, it is necessary that the shunt should have the same ratio of inductance to resistance as the current coil of the wattmeter.

The construction of a heavy current shunt having a known and fixed inductance is difficult, and the object of this invention is to provide an alternative method of connection, which permits the use of a non-inductive shunt to transfer a fraction of the direct current component to the wattmeter coil, and a current transformer to cause the same fraction of the alternating current components to flow in the wattmeter coil.

The features of my invention which I believe to be new and patentable will be pointed out in the appended claims.

For a more complete understanding of my invention reference may be had to the accompanying drawing in which a wattmeter 11 is shown connected to measure the power flowing in the circuit 12 which carries both direct current and alternating current components.

The wattmeter is provided with a potential coil 13 connected to the lines 12 through a multiplier 13' of a suitable resistance for the voltage of circuit 12. The wattmeter 11 is also provided with a current coil 14 which is connected in series with direct current shunt 15 and the secondary winding 16 of a current transformer 17. The direct current shunt 15 and the primary winding 18 of the current transformer 17 are connected in series and carry the current flowing in circuit 12. The relation between the resistance of shunt 15 and the leads and devices connected in shunt thereto is so chosen that a desired fraction of the direct current component flowing in circuit 12 will be transferred to coil 14. Current transformer 17 is designed to cause the same fraction of the alternating current components of current in circuit 12 to flow in the current coil 14. The shunt 15, transformer 17, and the connecting conductors, altogether, form a current divider or a device for producing a current which is a given fraction of a current flowing in the main circuit. The arrangement is such that the circuit including coil 14 carries a current in which the A. C. and D. C. components occur in the same ratio as in the current flowing in the main circuit 12.

The windings 16 and 18 of the current transformer 17 are connected in opposition and since the ratio of transformation of the current transformer is made equal to the shunting ratio of the direct current shunt 15, the direct current component of ampere-turns of winding 18 will be compensated by the opposing direct current component of ampere-turns of winding 16. Consequently the current transformer 17 is not subjected to any direct current effect.

In order to minimize the effect of any slight unbalance between the ratio of the shunt and the ratio of the current transformer, in causing direct current magnetization of the transformer core, the latter may, if desired, be provided with a small air gap 23 in its magnetic circuit, which will render it less susceptible to direct current magnetization without unduly impairing its performance as a current transformer. However, I prefer to utilize a shunt and a current transformer having as nearly as possible the same ratio in order that I may use a current transformer without an air gap so as to have a minimum leakage flux as this type maintains a constant ratio over a wider operating range.

The voltage drop across the shunt caused by the alternating component flowing through it, adds to the corresponding voltages generated by the current transformer and merely reduces the load upon the latter. Provided that the current transformer is suitably designed to supply the alternating voltage drop across the current coil of the wattmeter, it will determine the correct ratio between the alternating current in the primary and secondary circuits, irrespective of other alternating voltages, which may be introduced either by the shunt or by stray induction.

The accuracy of the arrangement is independent of the waveform within the limits of operation of the current transformer, and the latter can conveniently be designed to operate correctly over the range of frequency of the components of the current likely to be met with in all commercial rectifiers.

Although I have described the operation of my invention with particular reference to use with a wattmeter it will be understood that the same circuit arrangement may be used in connection with ammeters and other current responsive devices or it may be used for any other purpose where it is desired to divide in a known ratio a current containing direct and alternating components.

While I have described my invention in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States, is:

1. In combination with a primary electrical circuit carrying both alternating and direct current components and a secondary circuit, a current divider comprising an impedance, the effective value of which is substantially independent of variations in current or voltage, and a current transformer having a primary winding connected in series with said impedance in said primary electrical circuit and a secondary winding connected in series with said impedance in said secondary circuit.

2. In combination with a primary electrical circuit carrying both A. C. and D. C. components and a secondary circuit, a current divider comprising an impedance, the effective value of which is substantially independent of variations in current or voltage, and a current transformer having a primary winding connected in series with said impedance in said primary electrical circuit, and a secondary winding connected in series with said impedance in said secondary circuit, the polarity being such that the D. C. components in the primary and secondary windings of the current transformer will have neutralizing effects.

3. In combination with an electrical circuit carrying both alternating and direct current components, an electrical device to be supplied with a fraction of the current flowing in said circuit, and a current divider comprising a current shunt having an effective resistance substantially independent of variations in current or voltage, and a current transformer having a primary winding connected in series with said shunt in said electrical circuit and a secondary winding connected in series with said device across said shunt in such a manner that the direct current components in the primary and secondary windings of the current transformer will have neutralizing effects.

4. In combination with an electrical circuit carrying both A. C. and D. C. components, an electrical device to be supplied with a fraction of the current flowing in said circuit, and a current divider comprising a current shunt having an effective resistance substantially independent of variations in current or voltage, and a current transformer having a primary winding connected in series with said shunt in said electrical circuit, and a secondary winding connected in series with said device across said shunt.

5. In combination with primary and secondary electrical circuits carrying both alternating and direct current components, means for producing in said secondary circuit a current bearing a given ratio to the current in said primary circuit, said means comprising a resistor having a resistance of such a value with respect to the resistance of the secondary circuit as to cause direct currents to divide between the resistor and the secondary circuit with a given ratio between the sum of the direct currents and the direct current in the secondary circuit and a current transformer having a ratio of transformation equal to the said ratio of the resistor and having a primary winding connected in series with said resistor in said primary electrical circuit and a secondary winding connected in series in said secondary circuit, which is connected in parallel with said resistor.

6. In combination with an electrical circuit carrying both alternating and direct current components, a measuring device therefor comprising a current responsive device, a resistor and a current transformer having a primary winding connected in series with said resistor in said electrical circuit and a secondary winding, said current responsive device being connected in series with said secondary winding across said resistor.

7. In combination with an electrical circuit carrying both alternating and direct current components, a measuring device therefor comprising a current responsive device, a resistance current shunt and a current transformer having a ratio of transformation equal to the current ratio of the shunt and having a primary winding connected in series with said shunt in said electrical circuit and a secondary winding, said current responsive device being connected in series with said secondary winding across said shunt.

8. In combination with an electrical circuit carrying both alternating and direct current components, a power measuring device therefor comprising a potential coil responsive to the voltage of said electrical circuit, a current coil, a current shunt, and a current transformer having a primary winding connected in series with said shunt in one of the conductors of said electrical circuit and a secondary winding, said current coil being connected in series with said secondary winding across said shunt.

9. In combination with an electrical circuit carrying both alternating-current and direct-current components, a measuring device therefor, comprising a current-responsive device, a non-inductive shunt connected in series with said circuit and in parallel with said measuring device so as to transfer a fraction of the direct-current component to said current-responsive device, and a current transformer having a primary winding in series with said circuit and a secondary winding in series with said current responsive device so as to cause the same fraction of the alternating-current component to flow in said current-responsive device.

CHARLES G. GARTON.